United States Patent
Rantasalo et al.

(10) Patent No.: US 12,522,771 B2
(45) Date of Patent: Jan. 13, 2026

(54) METHOD FOR PRODUCING RENEWABLE FUEL AND BASE OIL

(71) Applicant: Neste Oyj, Espoo (FI)

(72) Inventors: Teemu Rantasalo, Espoo (FI); Olli Tuomala, Espoo (FI); Arto Neuvonen, Espoo (FI); Jesse Vilja, Espoo (FI)

(73) Assignee: NESTE OYJ, Espoo (FI)

( * ) Notice: Subject to any disclaimer, the term of this patent is extended or adjusted under 35 U.S.C. 154(b) by 694 days.

(21) Appl. No.: 17/776,902

(22) PCT Filed: Nov. 13, 2020

(86) PCT No.: PCT/FI2020/050757
§ 371 (c)(1),
(2) Date: May 13, 2022

(87) PCT Pub. No.: WO2021/094657
PCT Pub. Date: May 20, 2021

(65) Prior Publication Data
US 2022/0411699 A1    Dec. 29, 2022

(51) Int. Cl.
*C10G 3/00* (2006.01)
*C10G 7/00* (2006.01)
(Continued)

(52) U.S. Cl.
CPC ............... *C10G 45/58* (2013.01); *C10G 3/46* (2013.01); *C10G 3/50* (2013.01); *C10G 3/60* (2013.01); *C10G 7/00* (2013.01); *C10G 67/02* (2013.01); *C10L 1/08* (2013.01); *C10M 109/02* (2013.01); *C10G 2300/1011* (2013.01); *C10G 2300/1014* (2013.01); *C10G 2300/1018* (2013.01); *C10G 2300/202* (2013.01); *C10G 2300/205* (2013.01);
(Continued)

(58) Field of Classification Search
CPC ................................... C10G 3/50; C10G 3/60
See application file for complete search history.

(56) References Cited

U.S. PATENT DOCUMENTS 8,039,682 B2   10/2011   Mccall et al.
8,058,492 B2   11/2011   Anumakonda et al.
(Continued)

FOREIGN PATENT DOCUMENTS

BR       PI0908586 A2    9/2015
BR    112019014621 A2    4/2020
(Continued)

OTHER PUBLICATIONS

International Search Report (PCT/ISA/210) and Written Opinion (PCT/ISA/237) mailed on Feb. 11, 2021, by the Finnish Patent and Registration Office as the International Searching Authority for International Application No. PCT/FI2020/050754. (20 pages).
(Continued)

*Primary Examiner* — Ellen M Mcavoy
*Assistant Examiner* — Ming Cheung Po
(74) *Attorney, Agent, or Firm* — Buchanan Ingersoll & Rooney PC

(57) ABSTRACT

The present disclosure provides a base oil produced from feedstock of biological origin and a method for producing the same. The present disclosure provides base oil blends including the base oil of biological origin and at least one additional base oil.

8 Claims, 2 Drawing Sheets

(51) Int. Cl.
*C10G 45/58* (2006.01)
*C10G 67/02* (2006.01)
*C10L 1/08* (2006.01)
*C10M 109/02* (2006.01)

(52) U.S. Cl.
CPC .......... *C10G 2300/207* (2013.01); *C10G 2300/208* (2013.01); *C10G 2300/302* (2013.01); *C10G 2300/304* (2013.01); *C10G 2300/307* (2013.01); *C10G 2300/308* (2013.01); *C10G 2300/4006* (2013.01); *C10G 2300/4012* (2013.01); *C10G 2300/4081* (2013.01); *C10G 2300/80* (2013.01); *C10G 2400/04* (2013.01); *C10G 2400/08* (2013.01); *C10G 2400/10* (2013.01); *C10L 2200/0469* (2013.01); *C10L 2270/026* (2013.01); *C10L 2270/04* (2013.01); *C10M 2203/003* (2013.01)

(56) References Cited

U.S. PATENT DOCUMENTS

| | | | |
|---|---|---|---|
| 8,927,795 | B2 | 1/2015 | Mccall et al. |
| 9,321,970 | B2 | 4/2016 | Dupassieux et al. |
| 9,458,396 | B2 | 10/2016 | Weiss et al. |
| 9,469,583 | B2 | 10/2016 | Hakola et al. |
| 9,914,880 | B2 | 3/2018 | Fichtl et al. |
| 10,131,848 | B2 | 11/2018 | Aalto et al. |
| 10,246,658 | B2 | 4/2019 | Abhari et al. |
| 10,351,781 | B2 | 7/2019 | Sinha et al. |
| 10,640,721 | B2 | 5/2020 | Sandberg et al. |
| 10,954,459 | B2 | 3/2021 | Kuronen et al. |
| 11,001,774 | B2 | 5/2021 | Abhari et al. |
| 11,236,280 | B2 | 2/2022 | Abhari et al. |
| 11,306,265 | B2 | 4/2022 | Kuronen et al. |
| 11,459,510 | B2 | 10/2022 | Iversen et al. |
| 2009/0250376 | A1 | 10/2009 | Brandvold et al. |
| 2009/0283442 | A1 | 11/2009 | Mccall et al. |
| 2009/0287029 | A1 | 11/2009 | Anumakonda et al. |
| 2009/0294324 | A1 | 12/2009 | Brandvold et al. |
| 2009/0301930 | A1 | 12/2009 | Brandvold et al. |
| 2011/0232169 | A1 | 9/2011 | Cherrillo et al. |
| 2013/0116490 | A1 | 5/2013 | Dupassieux et al. |
| 2013/0305591 | A1 | 11/2013 | Mccall et al. |
| 2014/0291200 | A1 | 10/2014 | Weiss et al. |
| 2015/0011784 | A1 | 1/2015 | Aoki et al. |
| 2015/0018581 | A1* | 1/2015 | Kettunen .......... B01J 23/883 422/187 |
| 2015/0094506 | A1 | 4/2015 | Fichtl et al. |
| 2015/0191404 | A1 | 7/2015 | Aalto et al. |
| 2016/0289568 | A1 | 10/2016 | Dutta et al. |
| 2017/0009144 | A1 | 1/2017 | Aalto et al. |
| 2017/0158966 | A1 | 6/2017 | Fichtl et al. |
| 2017/0165655 | A1 | 6/2017 | Sinha et al. |
| 2017/0183593 | A1 | 6/2017 | Sandberg et al. |
| 2017/0327757 | A1 | 11/2017 | Abhari et al. |
| 2018/0148656 | A1 | 5/2018 | Laurent et al. |
| 2018/0216021 | A1 | 8/2018 | Kuronen et al. |
| 2019/0276758 | A1 | 9/2019 | Abhari et al. |
| 2019/0382666 | A1 | 12/2019 | Wiklund |
| 2020/0048522 | A1 | 2/2020 | Doucet et al. |
| 2020/0270544 | A1 | 8/2020 | Plancq |
| 2021/0163835 | A1 | 6/2021 | Kuronen et al. |
| 2021/0261875 | A1 | 8/2021 | Abhari et al. |
| 2022/0033717 | A1 | 2/2022 | Kiiski et al. |
| 2022/0081626 | A1 | 3/2022 | Myllyoja et al. |
| 2022/0177791 | A1 | 6/2022 | Kuronen et al. |
| 2022/0184581 | A1 | 6/2022 | Singh et al. |
| 2022/0396739 | A1 | 12/2022 | Nortio et al. |
| 2022/0403252 | A1 | 12/2022 | Vilja et al. |
| 2022/0411702 | A1 | 12/2022 | Sarjovaara et al. |
| 2023/0137687 | A1 | 5/2023 | Jadaun et al. |

FOREIGN PATENT DOCUMENTS

| | | |
|---|---|---|
| CN | 102027096 A | 4/2011 |
| CN | 102027097 A | 4/2011 |
| CN | 102124080 A | 7/2011 |
| CN | 103122253 A | 5/2013 |
| EP | 1741768 A1 | 1/2007 |
| EP | 1956070 A1 | 8/2008 |
| EP | 2141217 A1 | 1/2010 |
| EP | 1963461 B1 | 5/2018 |
| EP | 3352177 A1 | 7/2018 |
| FI | 960525 A | 8/1997 |
| GB | 692427 A | 6/1953 |
| JP | 2011526640 A | 10/2011 |
| WO | 2009151690 A2 | 12/2009 |
| WO | 2009151692 A2 | 12/2009 |
| WO | 2013115137 A1 | 8/2013 |
| WO | 2014128227 A1 | 8/2014 |
| WO | 2015101837 A2 | 7/2015 |
| WO | 2015142887 A1 | 9/2015 |
| WO | 2018078021 A1 | 5/2018 |
| WO | 2018138412 A1 | 8/2018 |
| WO | 2018139971 A1 | 8/2018 |
| WO | WO-2018234189 A1 * | 12/2018 .......... B01D 3/143 |
| WO | 2019002679 A1 | 1/2019 |
| WO | 2019092379 A2 | 5/2019 |
| WO | 2020109653 A1 | 6/2020 |
| WO | 2021013860 A1 | 1/2021 |
| WO | 2021094655 A1 | 5/2021 |
| WO | 2021094657 A1 | 5/2021 |
| WO | 2021094658 A1 | 5/2021 |

OTHER PUBLICATIONS

International Search Report (PCT/ISA/210) and Written Opinion (PCT/ISA/237) mailed on Feb. 17, 2021, by the European Patent Office as the International Searching Authority for International Application No. PCT/FI2020/050756. (11 pages).
International Search Report (PCT/ISA/210) and Written Opinion (PCT/ISA/237) mailed on Feb. 18, 2021, by the Finnish Patent and Registration Office as the International Searching Authority for International Application No. PCT/FI2020/050757. (15 pages).
International Search Report (PCT/ISA/210) and Written Opinion (PCT/ISA/237) mailed on Feb. 15, 2021, by the Finnish Patent and Registration Office as the International Searching Authority for International Application No. PCT/FI2020/050758. (19 pages).
International Search Report (PCT/ISA/210) mailed on Feb. 19, 2020, by the European Patent Office as the International Searching Authority for International Application No. PCT/FI2019/050817. (12 pages).
Written Opinion of the International Preliminary Examining Authority (PCT/IPEA/408) issued in corresponding International Patent Application No. PCT/FI2020/050754 dated Jan. 13, 2022. (15 pages).
Written Opinion of the International Preliminary Examining Authority (PCT/IPEA/408) issued in corresponding International Patent Application No. PCT/FI2020/050757 dated Dec. 16, 2021. (11 pages).
Written Opinion of the International Preliminary Examining Authority (PCT/IPEA/408) issued in corresponding International Patent Application No. PCT/FI2020/050758 dated Jan. 12, 2022. (15 pages).
International Preliminary Report on Patentability (PCT/IPEA/409) issued in corresponding International Patent Application No. PCT/FI2020/050754 dated Mar. 4, 2022. (37 pages).
International Preliminary Report on Patentability (PCT/IPEA/409) issued in corresponding International Patent Application No. PCT/FI2020/050757 dated Mar. 7, 2022. (29 pages).
International Preliminary Report on Patentability (PCT/IPEA/409) issued in corresponding International Patent Application No. PCT/FI2020/050758 dated Mar. 4, 2022. (41 pages).
Finnish Search Report issued in corresponding Patent Application No. 20185965 dated Mar. 7, 2019. (2 pages).

(56) References Cited

OTHER PUBLICATIONS

Chevron, "Diesel Fuels Technical Review", 2007, pp. 1-107, Chevron Corporation. (116 pages).
Dijs, I. J., et al., "Quantitative determination by 14C analysis of the biological component in fuels", Radiocarbon, 2006, vol. 48, Nr. 3, pp. 315-323. (9 pages).
DNV GL, Using biodiesel in marine diesel engines: new fuels, new Challenges, Online Oct. 14, 2020 (retrieved on Jan. 29, 2021, online at www.dnvgl.com/news/using-biodiesel-in-marine-dieselengines-new-fuels-new-challenges-186705. (2 pages).
Neste Retail, Technical Data Sheet, Jun. 14, 2021, https://www.neste.fi/static/datasheet_pdf/150240_fi.pdg. (2 pages).
Ovaska, T. et al., Effects of alternative marine diesel fuels on the exhaust particle size distributions of an off-road diesel engine:, Applied Thermal Engineering, Jan. 28, 2019, vol. 150, pp. 1168-1176. (9 pages).
Repsol, Electra 3x Plus Industr, Lubricants—Technical data sheet; Aug. 1, 2016, XP055666025, retrieved from the Internet URL: https:// www.repsol.com/imagenes/global/en/RP_ELECTRA_3X_PLUS_EN_tcml4-54907.pdf [retrieved on Feb. 6, 2020]. (2 pages).
Starck, L., et al., "Production of Hydroprocessed Esters and Fatty Acids (HEFA)—Optimisation of Process Yield", Oil & Gas Science and Technology Rev. IFP Energies nouvelles, Jun. 23, 2014, vol. 71, No. 1. (13 pages).
Mohd Noor et al., "Biodiesel as Alternative Fuel for Marine Diesel Engine Applications: A Review", Renewable and Sustainable Energy Reviews, Jun. 9, 2018, pp. 127-142, vol. 94, XP085453841.
The extended European Search Report issued on Dec. 15, 2023, by the European Patent Office in corresponding European Application No. 20886606.1. (9 pages).
The extended European Search Report issued on Dec. 15, 2023, by the European Patent Office in corresponding European Application No. 20886773.9. (10 pages).
Notification of the First Office Action issued on Mar. 11, 2023, by the Chinese Patent Office in corresponding Chinese Patent Application No. 202080078127.9, and an English Translation of the Office Action. (17 pages).
Office Action (Notice of Reasons for Refusal) issued on Jun. 13, 2023, by the Japanese Patent Office in corresponding Japanese Patent Application No. 2022-527229, and an English Translation of the Office Action. (11 pages).
Office Action issued on Apr. 3, 2023, by the Brazilian Patent Office in corresponding Brazilian Application No. BR112022008202-9, and an English Translation of the Office Action. (14 pages).
Office Action issued on Mar. 14, 2024, by the U.S. Patent and Trademark Office in U.S. Appl. No. 17/776,931.
Office Action issued on Sep. 12, 2024, by the U.S. Patent and Trademark Office in co-pending U.S. Appl. No. 17/776,831. (32 pages).
Office Action issued on Sep. 25, 2024, by the U.S. Patent and Trademark Office in co-pending U.S. Appl. No. 17/776,911. (30 pages).
Notice of Allowance issued on Feb. 27, 2025, by the U.S. Patent and Trademark Office in co-pending U.S. Appl. No. 17/776,911. (9 pages).
Office Action issued on Jan. 6, 2025, by the U.S. Patent and Trademark Office in co-pending U.S. Appl. No. 17/776,831. (8 pages).

* cited by examiner

METHOD FOR PRODUCING RENEWABLE FUEL AND BASE OIL

FIELD OF THE INVENTION

The present invention relates to a method for combined production of essentially two paraffinic products, one suitable for use as fuel and the other suitable for use as base oil. More particularly the invention relates to the paraffinic products obtainable by the method and their uses. Especially, one of the products is aviation fuel of biological origin and the further product is paraffinic base oil of biological origin.

BACKGROUND

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

Fuels and base oils are traditionally manufactured from crude mineral oil, which is typically separated by means of distillation into straight run kerosene fraction boiling in the aviation fuel range, and if required, followed by optional conversion processes like cracking etc. well known in the art. Mineral oil derived kerosene meeting aviation fuel requirements may also be produced for example by hydroprocessing or by caustic washing of straight run kerosene. Currently aviation fuels are produced also from renewable feedstock.

EP2141217 (A1) relates to hydrocarbons of biological origin suitable as aviation fuels or jet fuels and as blending stocks for aviation fuels and to a process for producing the same. The process comprises hydrodeoxygenation of renewable feedstock followed by isomerization, separating fractions and recycling the fraction boiling at a temperature above 200° C. to re-isomerization.

Base oils are commonly used for production of lubricants, such as lubricating oils for automotives, industrial lubricants and lubricating greases. They are also used as process oils, white oils and metal working oils. All lubricants comprise base oil or base oil components. Typically, lubricant formulations contain about 90% base oil and about 10% additives. Lubricating base oil is the major constituent in these finished lubricants and contributes significantly to the properties of the finished lubricant product. In general, a few lubricating base oils are used to manufacture a wide variety of finished lubricants by varying the mixtures of individual lubricating base oil components and individual additives. Base oils are traditionally produced from fossil or synthetic feedstocks. However, base oils are currently available also from renewable feedstocks.

EP1963461 (B1) discloses a process for producing a branched saturated hydrocarbon component of biological origin to be used as base oil. The process comprises ketonisation, hydrodeoxygenation, and isomerization steps. Raw material of biological origin derived from plant oils, animal fats, natural waxes, and carbohydrates may be used as feedstock.

The American Petroleum Institute's (API) has categorized base oils into five groups which are specified by the saturate level, sulfur level, and viscosity index. Base oil typically contains saturated hydrocarbons. They may be naturally present in the base oil or formed during base oil production. If the level of saturated hydrocarbons is high, the molecular bonds in the oil are stronger. This will increase the resistance to breakdown, oxidation and loss of viscosity. Sulfur is naturally included in crude oil, and its reactions with oxygen are harmful to the performance of the base oil and may produce exhaust gases in the used devices. When the content of sulphur is low, and the purity of the oil is better and the probability of corrosion and oxidation is decreased. The Viscosity Index (VI) refers to the change rate in viscosity as a function of the base oil temperature. Viscosity values are typically measured at 40° C. (KV40) and 100° C. (KV100). When VI is high, the changes are smaller with differences in temperature. All oils increase in viscosity when the temperature decreases, and decrease in viscosity when temperatures increase. API base oil classification is shown in Table 1.

TABLE 1

| API base oil classification and specifications thereof. | | | |
|---|---|---|---|
| Group | Saturated hydrocarbons, wt-% (ASTM D 2007) | Sulfur, wt-% (ASTM D 1552/ D 2622/ D 3120/ D4294/D 4927 | Viscosity index (VI) (ASTM D 2270) |
| I | <90 and/or | >0.03 | 80 ≤ VI < 120 |
| II | ≥90 | ≤0.03 | 80 ≤ VI < 120 |
| III | ≥90 | ≤0.03 | ≥120 |
| IV | All polyalphaolefins (PAO) | | |
| V | All oher base oils not belonging to Groups I-IV | | |

Group I, II, and III are typically derived from crude oil e.g. mineral oil, Group IV is a fully synthetic oil, and Group V is for all base oils that are not included in one of the other groups, including naphthenic oils and esters. Group II base oils have typically undergone hydrocracking breaking down the large hydrocarbon molecules into smaller ones. The hydrocarbon molecules of these oils are highly saturated, giving them good antioxidation properties. Group III oils have typically undergone severe hydrocracking which results in a purer base oil with a higher quality. Further, there are unofficial base oil classifications not recognized by the American Petroleum Institute (API), however, they are widely used and marketed for motor oils and automatic transmission fluids. In addition to the official classification, also Group II+ is commonly used in this field, this group comprising saturated and non-sulfurous base oils having viscosity indices of more than 110, but below 120. In these classifications saturated hydrocarbons include paraffinic and naphthenic compounds, but not aromatics.

There is also available a definition for base stocks according to API 1509 as: "A base stock is a lubricant component that is produced by a single manufacturer to the same specifications (independent of feed source or manufacturer's location); that meets the same manufacturer's specification; and that is identified by a unique formula, product identification number, or both. Base stocks may be manufactured using a variety of different processes." Base oil is the base stock or blend of base stocks used in API-licensed oil. The known base stock types are 1) Mineral oil (paraffinic, naphthenic, aromatic), 2) Synthetic (polyalphaolefins, alkylated aromatics, diesters, polyol esters, polyalkylene glycols, phosphate esters, silicones), and 3) Plant oil.

There is a growing end user demand for sustainable, bio-originating possibly even recycled alternatives in the field of aviation fuels and base oils. Although not yet mandated to contain bio-originating products, there are clear signs of legislative directives emerging also for these areas. Currently, there is limited offering of bio-originating alternatives available for the above-mentioned applications. Further, the bio-originating alternatives are typically not cost competitive with the conventional offering, which has limited the development of the bio-originating and recycled aviation fuels and base oils. There is a need to develop feasible and effective processes in these areas.

Base oils of biological origin are already presently offered in the market, but there is a continuous demand for more efficient processing and enhanced product quality for desired applications.

Already for a long time, especially the automotive industry has required lubricants and thus base oils with improved technical properties or desired technical properties for selected applications. Increasingly, the specifications for finished lubricants require products with excellent low temperature properties, high oxidation stability and low volatility. In addition to low pour points also the low-temperature fluidity of multi-grade engine oils is needed to guarantee that in cold weather the engine starts easily. The low-temperature fluidity is demonstrated as apparent viscosity in cold cranking simulator (CCS) tests at −5 to −40° C. temperature. For example, lubricating base oils having KV100 of about 4 cSt should typically have CCS viscosity at −30° C. (CCS-30) lower than 1800 cP and oils having KV100 of about 5 cSt should have CCS-30 lower than 2700 cP. The lower the value is the better. In general, lubricating base oils should have Noack volatility no greater than current conventional Group I or Group II light neutral oils. Currently, only a small fraction of the base oils manufactured today can be used in formulations to meet the latest, most demanding lubricant specifications. A particular challenge is to provide lubricating base oil having a low viscosity value and at the same time high flash point.

Moreover, there is a growing demand for specific lighter base oils in the market i.e. base oils having a low viscosity range for special base oil products. In addition to the viscosity requirement, there are several other requirements for the overall performance and properties for this kind of base oil. The offering of these kinds of base oils in the market is scarce, or even non-existent if biological origin is one of the criteria.

Aviation fuel market has been forecasted to grow during 2018-2022 at a CAGR (Compound Annual Growth Rate) of 3.81%. IATA (International Air Transport Association) recognizes the need to address the global challenge of climate change and adopted a set of ambitious targets to mitigate $CO_2$ emissions from air transport. One way to achieve this is by improved technology, including the deployment of sustainable low-carbon fuels.

The deployment of more sustainable aviation fuels means that more feedstock material must be made available globally to supply both the aviation and base oil industry. The synthetic or renewable fuel production technologies have traditionally been designed for producing fuels for the road transportation sector where the fuels' cold temperature properties are not as critical as in aviation.

There is a clear need for a process to produce lighter fuels meeting the aviation fuel requirements. And, at the same time production flexibility needs to be enhanced, in view of further producing high quality renewable base oils.

And naturally, the feedstock usage efficiency is important, the lower the production losses, the higher is the profitability of the fuel and base oil production process in the long run.

SUMMARY

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

According to the first aspect, here is provided a method for combined production of aviation fuel and base oil both of biological origin, the method comprising providing feedstock of biological origin containing fatty acids and/or esters of fatty acids, and subjecting the feedstock to hydrotreatment and isomerization to obtain a paraffinic hydrocarbon intermediate, and fractionating said paraffinic hydrocarbon intermediate into at least two fractions, a lighter fraction fulfilling the specification ASTM D7566-20 Annex A2 for aviation fuel, and a heavier fraction fulfilling the following specifications for a base oil component, comprising saturates (ASTM D2007) more than 90 wt-%;
sulfur content (ASTM D 1552/D2622/D3120/D4294/D4927) 0.03 wt-% or less;
kinematic viscosity 100° C. (EN ISO 3104/ASTMD445) between 1.3-3.5 $mm^2/s$;
kinematic viscosity 40° C. (EN ISO 3104/ASTMD445) between 3.4-13 $mm^2/s$;
pour point (ASTM D97) less than −24° C.;
flash point (ENISO2719/ASTMD93) more than 120° C., and wherein the production capacity of the lighter fraction and the production capacity of the heavier fraction are adjusted by selection of process conditions, preferably the isomerization process conditions, wherein yield of the lighter fraction is 60-90 wt-% of the total weight of the formed fractions, and yield of the heavier fraction is 10-40 wt-% of the total weight of the formed fractions, and wherein a combined yield of the two fractions is at least 98 wt-% of the paraffinic hydrocarbon intermediate of biological origin.

One or more examples of implementations are set forth in more detail in the accompanying drawing and the description below. Other features will be apparent from the description and drawing, and from the claims.

The present invention provides a process for producing both lighter fuel components suitable for use as aviation fuel and meeting the requirements thereto, and at the same time heavier base oil components suitable for use as base oil are obtained, meeting the desired base oil requirements. Moreover, production flexibility in view of producing desired components to serve two or more transportation sectors is maintained by suitably fractionating the processed feedstock into the lighter fraction and into the heavier fraction without losses in feedstock use. Consequently, the fractionation is a critical step because if done unsuccessfully, it can cause that the products obtained do not fulfil either the aviation fuel or the base oil requirements.

On the other hand, considerable benefits and production flexibility are obtained as through the well-executed fractionation the end products serve two demanding sectors. In the present invention, the feedstock usage efficiency is excellent and the production losses are low, meaning that the profitability of the fuel and base oil production processes is high in the long run.

As there typically is less flexibility on the properties that the aviation fuel component must meet, it drives the fractionation process and leaves the base oil fraction as the bottom product. In the method of the present invention it is beneficial that the renewable base oil fraction meets the base oil specification as such, and exhibits even improved properties over other base oil types when blended.

Hence, as a second aspect, herein is provided base oil component of biological origin comprising 0-5 wt-% of n-paraffins in C16-C20 range and 90-97 wt-% isoparaffins in C16-C20 range, from 21 wt-% to 45 wt-% of C17 paraffins and from 50 wt-% to 75 wt-% of C18 paraffins.

Solution offers sustainable and green solutions for API group II, possibly even group III, and V base oil grades. It is possible to use this base oil component of biological origin straight as such to base oil or blend it with e.g. fossil component which offers a large scale of solutions to the lubricative or heat transfer oil markets.

As a third aspect of the present invention, here is further provided a base oil blend comprising the base oil component of biological origin and at least one additional base oil component, selected from fossil base oil and synthetic base oil and combinations thereof.

As a fourth aspect, a lubricating oil composition comprising the base oil component of biological origin of the present invention and/or the base oil blend of the present invention, and at least one auxiliary agent is further provided.

As fifth aspect here is provided a use of the base oil component of biological origin for manufacturing a base oil blend fulfilling the API Group II or III or V specifications for base oil.

As yet another aspect, here is further provided a use of the base oil component of biological origin or the blend according to the present invention for manufacturing a lubricating oil formulation, comprising additionally at least one auxiliary agent.

Embodiments are defined in the dependent claims.

In the current base oil market there is lack of green solutions or volumes are marginal. The method of the present invention offers high volumes to API Group II or III or V base oils.

BRIEF DESCRIPTION OF THE DRAWINGS

In the following the invention will be described in greater detail by means of preferred embodiments with reference to the attached FIG. 1 and FIG. 2.

DETAILED DESCRIPTION OF EMBODIMENTS

Figure 1:
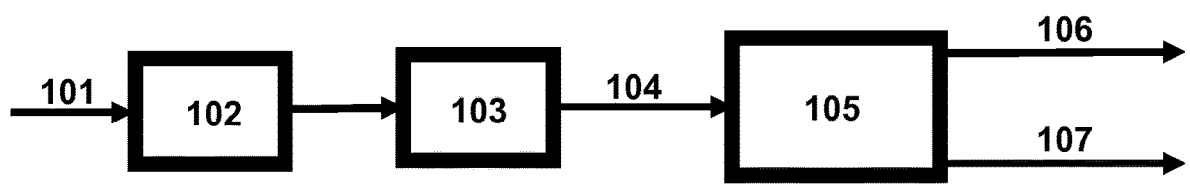
FIG. 1 illustrates an exemplary process.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising", "containing" and "including" should be understood as not limiting the described embodiments to consist of only those features that have been mentioned and such embodiments may contain also features/structures that have not been specifically mentioned.

The present invention discloses a method for combined production of two paraffinic hydrocarbon products, an aviation fuel component and a base oil component, by hydrotreatment and isomerization of feedstock of biological origin followed by fractionation. More specifically, the present invention discloses a method for combined production of paraffinic products of biological origin, comprising hydrodeoxygenation and hydroisomerization of feedstock of biological origin, followed by fractionating the obtained paraffinic intermediate of biological origin, preferably by distillation, into at least two fractions, such that within the two fractions a lighter fraction fulfils a specification for an aviation fuel component and a heavier fraction fulfils a specification for a base oil component. A lighter fraction means that it is a lower temperature boiling range fraction, and a heavier fraction means that it is a higher temperature boiling range fraction. The aviation fuel component is preferably a synthesized paraffinic kerosine from hydrogenated esters and fatty acids (HEFA-SPK) fulfilling the ASTM D7566-20 Annex A2 standard for aviation turbine fuel containing synthesized hydrocarbons. The base oil component is defined as one at least fulfilling a set of specifically desired properties, such as saturates (ASTM D2007) more than 90 wt-%, sulfur content (ASTM D 1552/D2622/D3120/D4294/D4927) 0.03 wt-% or less, kinematic viscosity 100° C. (EN ISO 3104/ASTMD445) between 1.3-3.5 mm$^2$/s, kinematic viscosity 40° C. (EN ISO 3104/ASTMD445) between 3.4-13 mm$^2$/s, pour point (ASTM D97) less than −24° C., flash point (ENISO2719/ASTMD93) more than 120° C.

According to certain embodiments, the base oil component of biological origin may further fulfil the API Group II or III or V specifications for base oil, provided that the kinematic viscosity 100° C. (EN ISO 3104/ASTMD445) is between 2-3.5 mm$^2$/s.

By term "hydrotreatment" is meant herein a catalytic process of organic material by all means of molecular hydrogen. Preferably, hydrotreatment removes oxygen from organic oxygen compounds as water i.e. by hydrodeoxygenation (HDO). Additionally or alternatively hydrotreatment may remove sulphur from organic sulphur compounds as hydrogen sulphide ($H_2S$), i.e. by hydrodesulphurisation, (HDS), it may further remove nitrogen from organic nitrogen compounds as ammonia ($NH_3$), i.e. by hydrodenitrification (HDN), and/or it may remove halogens, for example chlorine, from organic chloride compounds as hydrochloric acid (HCl), i.e. by hydrodechlorination (HDCl). It may further remove aromatic compounds by hydrodearomatization (HDA).

By the term "hydrodeoxygenation" (HDO) is meant herein hydrodeoxygenation of feedstock of biological origin, such as feedstock comprising triglycerides or other fatty acid derivatives or fatty acids, is meant the removal of carboxyl oxygen as water by means of molecular hydrogen under the influence of a catalyst. The hydrodeoxygenation may be accompanied by hydrodesulphurisation, hydrodenitrification, and/or hydrodechlorination reactions.

Removing oxygen from the feedstock of biological origin may also be done by decarboxylation where oxygen is removed in the form of $CO_2$, and by decarbonylation where oxygen is removed in the form of CO.

By the term "isomerization" is meant reaction(s) that causes branching of hydrocarbon chains of hydrotreated feedstock. Branching of hydrocarbon chains improves e.g. cold properties, the isomerized hydrocarbons have better cold properties compared to merely hydrotreated feedstock. Better cold properties refer to e.g. a lower temperature value of a pour point. The formed isoparaffins may have one or more side chains, or branches, typically methyl or ethyl groups.

Typically, HDO and isomerization, such a hydroisomerization, reactions take place in the presence of a catalyst suitable for the reaction. Reaction conditions and catalysts typically used in the hydrodeoxygenation of biological material and in the isomerization of resultant n-paraffins are disclosed in several documents. Examples of such processes are presented in e.g. F1100248, Examples 1-3, and in WO 2015/101837 A2.

Feedstock of Biological Origin

Feedstock of biological origin i.e. renewable feedstock refers to a feedstock derived from a biological raw material. The sources for renewable feedstock are numerous including oils and/or fats, usually containing lipids (e.g. fatty acids or glycerides), such as plant oil/fats, vegetable oil/fats, animal oil/fats, algae oil/fats, fish oil/fats and algae oil/fats, or oil/fats from other microbial processes, for example, genetically manipulated algae oil/fats, genetically manipulated oil/fats from other microbial processes and also genetically manipulated vegetable oil/fats. Components of these materials may also be used, for example, alkyl esters, typically C1-C5 alkyl esters, such as methyl, ethyl, propyl, iso-propyl, butyl, sec-butyl esters, or olefins. Additionally, the renewable feedstock may include C1-C5 alkyl alcohols, particularly methyl, ethyl, propyl, iso-propyl, butyl, and/or sec-butyl esters of fatty acids, and any combinations thereof.

The renewable feedstock may additionally include free fatty acids, fatty acid esters (including mono-, di-, and triglycerides), or combinations thereof. For example, the free fatty acids may include free fatty acids obtained by stripping free fatty acids from a triglyceride transesterification feedstock. The renewable feedstock may include the fatty acid distillate from vegetable oil deodorization. Depending on level of pretreatment, fats, oils, and greases may contain impurities, such as between about 1 wppm and about 1,000 wppm phosphorus, and between about 1 wppm and about 500 wppm total metals, mainly sodium, potassium, magnesium, calcium, iron, and copper. Plant and/or vegetable oils and/or microbial oils may include babassu oil, *carinata* oil, soybean oil, canola oil, coconut oil, rapeseed oil, crude tall oil (CTO), tall oil (TO), tall oil fatty acid (TOFA), tall oil pitch (TOP), palm oil (PO), palm oil fatty acid distillate (PFAD), jatropha oil, palm kernel oil, sunflower oil, castor oil, camelina oil, archaeal oil, bacterial oil, fungal oil, protozoal oil, algal oil, seaweed oil, oils from halophiles, and mixtures of any two or more thereof. These oils may have been classified as crude, degummed, and RBD (refined, bleached, and deodorized) grade, depending on the level of pretreatment and residual phosphorus and metals content. Animal fats and/or oils may include inedible tallow, edible tallow, technical tallow, floatation tallow, lard, poultry fat, poultry oils, fish fat, fish oils, and mixtures of any two or more thereof. Greases may include yellow grease, brown grease, waste vegetable oils, restaurant greases, trap grease from municipalities such as water treatment facilities, and spent oils from industrial packaged food operations, and mixtures of any two or more thereof.

These oils and/or fats typically comprise C10-C24 fatty acids and derivatives thereof, including esters of fatty acids, glycerides, i.e. glycerol esters of fatty acids. The glycerides may specifically include monoglycerides, diglycerides and triglycerides.

In one embodiment, the feedstock includes waste and residue material originating from animal fat/oil, plant fat/oil such as palm oil and derivatives thereof, and used cooking oil (UCO).

The $^{14}C$-isotope content can be used as evidence of the renewable or biological origin of a feedstock or product. Carbon atoms of renewable material comprise a higher number of unstable radiocarbon ($^{14}C$) atoms compared to carbon atoms of fossil origin. Therefore, it is possible to distinguish between carbon compounds derived from biological sources, and carbon compounds derived from fossil sources by analysing the ratio of $^{12}C$ and $^{14}C$ isotopes. Thus, a particular ratio of said isotopes can be used to identify renewable carbon compounds and differentiate those from non-renewable i.e. fossil carbon compounds. The isotope ratio does not change in the course of chemical reactions. Example of a suitable method for analysing the content of carbon from biological sources is ASTM D6866 (2020). An example of how to apply ASTM D6866 to determine the renewable content in fuels is provided in the article of Dijs et al., Radiocarbon, 48(3), 2006, pp 315-323. For the purpose of the present invention, a carbon-containing material, such as a feedstock or product is considered to be of biological i.e. renewable origin if it contains 90% or more modern carbon (pMC), such as 100% modern carbon, as measured using ASTM D6866.

The oils and/or fats of biological origin may include a single kind of oil, a single kind of fat, mixtures of different oils, mixtures of different fats, mixtures of oil(s) and fat(s), fatty acids, glycerol, and/or mixtures of the afore-mentioned. Typically, when waste and residue material are used they comprise mixtures of several components.

In an embodiment, the feedstock of biological origin contains C8-C22 hydrocarbons, C10-C20 hydrocarbons, or C15-C18 hydrocarbons.

Hydrotreatment

Several process conditions for hydrodeoxygenation are known. For example, the hydrodeoxygenation of feedstock of biological origin may be carried out on sulfided metal catalyst or a metal sulphide catalyst. The metal may comprise one or more Group VI metals, such as Mo or W, or one or more Group VIII non-noble metals such as Co or Ni. The catalyst may be supported on any convenient support, such as alumina, silica, zirconia, titania, amorphous carbon, zeolite, molecular sieves or combinations thereof. Usually the metal is impregnated or deposited on the support as metal oxides and then typically converted into their sulphides. Examples of typical catalysts for hydrodeoxygenation are molybdenum containing catalysts, NiMo, CoMo, or NiW catalysts, supported on alumina or silica, but many other hydrodeoxygenation catalysts are known in the art, and have been described together with or compared to NiMo and/or CoMo catalysts. The hydrodeoxygenation is preferably carried out under the influence of sulphided NiMo or sulphided CoMo or NiW catalysts in the presence of hydrogen gas.

The hydrodeoxygenation may be performed under a hydrogen pressure from 10 to 200 barg (bar gauge), at temperatures from 200 to 400° C., and liquid hourly space velocities of 0.2 $h^{-1}$ to 10 $h^{-1}$. During a hydrodeoxygenation step using a sulfided catalyst, the sulfided state of the catalyst may be maintained by the addition of sulphur in the gas phase or by using a feedstock having sulphur containing mineral oil blended with the feedstock of biological origin. The sulphur content of the total feed being subjected to hydrodeoxygenation may be, for example, in the range of 50 wppm (ppm by weight) to 20 000 wppm, preferably in the range of 100 wppm to 1000 wppm.

Effective conditions for hydrodeoxygenation may reduce the oxygen content of the feedstock of biological origin to less than 1 wt-%, such as less than 0.5 wt-% or less than 0.2 wt-%. In some cases, the conditions may be selected to yield partial hydrodeoxygenation corresponding to a deoxygenation of at least 40 wt-%, at least 50 wt-% or at least 75 wt-%.

In a preferred embodiment, preparing a paraffinic hydrocarbon intermediate of biological origin from feedstock of biological origin comprises subjecting the feedstock to a deoxygenation treatment.

In the present invention, the deoxygenating method is not particularly limited and any suitable method may be employed. Suitable methods are, for example, hydrotreating, such as hydrodeoxygenation (HDO), catalytic hydrodeoxygenation (catalytic HDO), catalytic cracking (CC), or a combination thereof. Other suitable methods include decarboxylation and decarbonylation reactions, either alone or in combination with hydrotreating.

The hydrodeoxygenation may be accompanied by hydrodesulphurisation, hydrodearomatization, hydrodenitrification, and/or hydrodechlorination reactions.

In one embodiment, the deoxygenation treatment, to which the feedstock of biological origin is subjected, is hydrotreatment. Preferably, the feedstock of biological origin is subjected to hydrodeoxygenation (HDO) which preferably uses a HDO catalyst. Catalytic HDO is the most common way of removing oxygen and has been extensively studied and optimized. However, the present invention is not limited thereto. As the HDO catalyst, a HDO catalyst comprising hydrogenation metal supported on a carrier may be used. Examples include a HDO catalyst comprising a hydrogenation metal selected from a group consisting of Pd, Pt, Ni, Co, Mo, Ru, Rh, W or a combination of these, preferably from Ni, Mo or W. Alumina or silica is suited as a carrier, among others. The hydrodeoxygenation step may, for example, be conducted at a temperature of 100-500° C. and at a pressure of 10-150 bar (absolute).

Preparing a hydrotreated feedstock from the feedstock of biological origin may comprise a step of hydrocracking hydrocarbons in feedstock of biological origin. Thus, the chain length of the hydrocarbon of biological origin may be adjusted and the product distribution of the produced mixture of hydrocarbons of biological origin can be indirectly controlled.

In one embodiment, the hydrotreatment, preferably hydrodeoxygenation, is performed under a hydrogen pressure from 10 to 150 bar, such as 20-120 bar, such as 30-100 bar, and at a temperature from 200 to 400° C., such as 250-380° C., such as 280-360° C.

In one embodiment, the hydrotreatment is performed in the presence of one or more catalyst(s) selected from hydrogenation metal on a support, such as a catalyst selected from a group consisting of Pd, Pt, Ni, Co, Mo, Ru, Rh, W or any combination thereof, preferably a catalyst comprising one or more catalyst(s) selected from CoMo, NiMo, NiW, CoNiMo on a support, for example an alumina support.

Isomerization

The paraffinic hydrocarbon intermediate of biological origin of the present invention may be provided by subjecting at least straight chain hydrocarbons obtained by hydrotreatment to an isomerization.

While most thermal or catalytic conversions (such as HDO) result in a minor degree of isomerization, usually less than 5 wt-%, or even less than 1 wt-%, such as 0.5 or less, the isomerization step may be employed as a step which leads to a significant increase in the content of isoparaffins.

Isomerization causes branching of hydrocarbon chains of the hydrotreated feedstock. Branching of hydrocarbon chains improves e.g. cold properties, the isomerized hydrocarbons have better cold properties compared to merely hydrotreated feedstock. Better cold properties refer to e.g. a lower temperature value of a pour point. The formed isoparaffins may have one or more side chains, or branches, typically methyl or ethyl groups.

The isomerization step may be carried out in the presence of an isomerization catalyst, and optionally in the presence of hydrogen added to the isomerization process. Suitable isomerization catalysts contain a molecular sieve and/or a metal selected from Group VIII of the periodic table and optionally a carrier. Preferably, the isomerization catalyst contains SAPO-11, or SAPO-41, or ZSM-22, or ZSM-23, or fernerite, and Pt, Pd, or Ni, and $Al_2O_3$, or $SiO_2$. Typical isomerization catalysts are, for example, Pt/SAPO-11/$Al_2O_3$, Pt/ZSM-22/$Al_2O_3$, Pt/ZSM-23/$Al_2O_3$, and Pt/SAPO-11/$SiO_2$. The catalysts may be used alone or in combination. The presence of added hydrogen is particularly preferable to reduce catalyst deactivation. In a preferred embodiment, the isomerization catalyst is a noble metal bifunctional catalyst, such as Pt-SAPO and/or Pt-ZSM-catalyst, which is used in combination with hydrogen. The isomerization step may, for example, be conducted at a temperature of 200-500° C., preferably 280-400° C., and at a pressure of 10-150 bar, preferably 30-100 bar (absolute).

In an embodiment, the isomerization is performed at a temperature of 300° C. or above, preferably at 300-350° C., such as 330-350° C.

The isomerization step, preferably hydroisomerization, may, for example, be conducted at a temperature of 200-500° C., such as 280-400° C., such as 280-370° C. and at a pressure of 10-150 bar (absolute), such as 20-100 bar, such as 20-50 bar.

The isomerization is performed, for example, in the presence of one or more catalyst(s) comprising a Group VIII metal on a support, where the support is selected from silica, alumina, clays, titanium oxide, boron oxide, zirconia, which can be used alone or as a mixture, preferably silica and/or alumina.

The Paraffinic Hydrocarbon Intermediate of Biological Origin

The paraffinic hydrocarbon intermediate of biological origin of the present invention may be provided by isomerizing the hydrotreated feedstock.

Generally, a paraffinic hydrocarbon intermediate may be produced from the feedstock of biological origin material using any known method. Specific examples of a method for producing the paraffinic intermediate of biological origin are provided in the European patent application EP1741768 A1. Also, other methods may be employed, particularly another BTL (biomass-to-liquid) method may be chosen, for example biomass gasification followed by a Fischer-Tropsch method.

The paraffinic hydrocarbon intermediate of biological origin may be obtained by hydrodeoxygenation and isomerization of feedstock of biological origin. The paraffinic hydrocarbon intermediate, such as liquid hydrocarbon intermediate, thus obtained has a carbon number distribution in the range of C8 to C22 or C10 to C20, preferably in the range of C15 to C18, and distillation range of 140° C. to 340° C., preferably 180° C. to 320° C. The paraffinic hydrocarbon intermediate contains mainly n-paraffins and i-paraffins.

The amount of i-paraffins may be adjusted through isomerization, such as adjusting the isomerization temperature, to reach desired characteristics of the product fractions. The resulting isomerization degree is high, over 95%.

In an embodiment, the cloud point of the paraffinic hydrocarbon intermediate of biological origin is −30° C. or below, −34° C. or below, −40° C. or below, or −48° C. or below, as measured according to EN23015.

Examples of Production of the Paraffinic Hydrocarbon Intermediate of Biological Origin The feedstock of biological origin may be subjected at least to a hydrodeoxygenation reaction in the presence of hydrogen and a hydrodeoxygenation catalyst, and to an isomerization reaction in the presence of an isomerization catalyst, for obtaining the paraffinic hydrocarbon intermediate. If a hydrodeoxygenation step and an isomerization step are applied, these may be performed either simultaneously or in sequence.

In one embodiment the base oil component is produced in two steps, first hydrotreating the feedstock and subsequently isomerizing the hydrotreated feedstock. The hydrodeoxygenation reaction may be performed in the presence of hydrogen gas and a hydrodeoxygenation catalyst, such as CoMo, NiMo, NiW, CoNiMo on a support, for example, an alumina support, zeolite support, or a mixed support. The hydrodeoxygenation reaction may, for example, be conducted at a temperature in the range from 250 to 400° C., and at a pressure in the range from 10-150 bar, for example 250-380° C. and 20-120 bar, such as 280-360° C. and 30-100 bar, at a WHSV (weight hourly space velocity, i.e. mass flow/catalyst mass) in the range from 0.5 to 3 h-1, and a $H_2$/feed ratio of 350-900 Nl/l, using a catalyst, such as NiMo, optionally on an alumina support. The product of the hydrodeoxygenation step, i.e. the hydrotreated feedstock of biological origin, may be subjected to an isomerization step in the presence of hydrogen and an isomerization catalyst. The isomerization catalyst may be a noble metal bifunctional catalyst such as Pt-SAPO or Pt-ZSM catalyst or NiW. The isomerization reaction may, for example, be conducted at a temperature of 250-400° C. and at a pressure of 10-60 bar. The isomerization reaction may, for example, be conducted at a temperature of 250-400° C., at a pressure of between 10 and 60 bar, with WHSV of 0.5-3 h-1, and $H_2$/feed ratio of 100-800 Nl/l.

In one embodiment the hydrodeoxygenation and hydroisomerization are carried out in a single step on the same catalyst bed using a single catalyst for this combined step, e.g. NiW, or a Pt catalyst, such as Pt/SAPO in a mixture with a Mo catalyst on a support, e.g. NiMo on alumina.

The hydrotreatment step and the isomerization step may be conducted in the same reactor. Alternatively, hydrotreatment step and the isomerization step may be conducted in separate reactors.

In a specific embodiment, the present invention provides a method for production of the base oil component of biological origin comprising hydrodeoxygenating and hydroisomerizing a feedstock of biological origin to obtain a paraffinic hydrocarbon intermediate; and fractionating, preferably by distillation, the paraffinic hydrocarbon intermediate into at least two fractions, comprising a lighter fraction fulfilling the specification for an aviation fuel component, and a heavier fraction fulfilling the specification for a base oil component, wherein the production capacity of the lighter fraction and the production capacity of the heavier fraction are adjusted by the selection of process conditions, preferably the isomerization conditions, wherein a yield of the lighter fraction is 60-90 wt-% of the total weight of the fractions, and a yield of the heavier fraction is 10-40 wt-% of the total weight of the fractions, and wherein the aviation fuel component is HEFA-SPK fuel component, and wherein a specification for the HEFA-SPK fuel component is ASTM D7566-20, and wherein a combined yield of the two fractions is at least 98 wt-% of the paraffinic hydrocarbon intermediate of biological origin.

Fractionation

The paraffinic hydrocarbon intermediate of biological origin of the present invention provided by isomerized hydrotreated feedstock is suitably fractionated for obtaining at least an aviation fuel component and a base oil component.

In an embodiment, the fractionating is provided by distillation. In the distillation process, the cloud point, distillation profile and density of the paraffinic hydrocarbon intermediate influences the yields of the distillates. To maximize the yield of the aviation fuel component, or more specifically HEFA-SPK component, a paraffinic hydrocarbon intermediate with a lower cloud point may be utilized. A typical cloud point of the paraffinic hydrocarbon intermediate may be in the range of −30° C. or below, or in the range of −34° C. or below, without restricting it to that.

The balance between the renewable base oil component and the aviation fuel component volumes produced may be adjusted by the selection of process conditions in the production process of the paraffinic hydrocarbon intermediate of biological origin, which affects the distillation cut point between the product fractions. This makes it possible to provide a cost-efficient and material-efficient but yet flexible way to produce these paraffinic products of biological origin with only trace amounts of by-products, if any. For example, less than 2 wt-% or even less than 1 wt-% of by-products lighter than aviation fuel component or heavier than the base oil component, may be generated. This means that the combined yield of the two fractions is at least 98 wt-%, or at least 99 wt-%, calculated from the amount of paraffinic hydrocarbon intermediate subjected to fractionation. In certain embodiments the yield of the two fractions may be 99.5 wt-%, 99.8 wt-% or even 100 wt-% of amount of paraffinic hydrocarbon intermediate subjected to fractionating.

In an embodiment, yield of the lighter fraction is 60-90 wt-%, such as 68-90 wt-%, of the total weight of the two fractions, and yield of the heavier fraction is 10-40 wt-%, such as 10-32 wt-%, of the total weight of the two fractions.

In an embodiment, yield of the lighter fraction is 70-90 wt-%, such as 75-90 wt-%, or 80-90 wt-%, or even 83-90 wt-%, or of the total weight of the two fractions, and yield of the heavier fraction is 10-30 wt-%, such as 10-25 wt-%, or 10-20 wt-%, or even 10-17 wt-%, of the total weight of the two fractions.

Shorter chain hydrocarbons enable producing more aviation fuel component and less base oil component. More base oil component may be produced by using plenty of C16 or longer chain hydrocarbons, such as from C16 to C29, as the feedstock of biological origin.

Composition mixtures boil over a temperature range as opposed to having a single boiling point for a pure compound, due to a selection of compounds of varying carbon chain length ranges included therein. The boiling range covers a temperature interval from the initial boiling point, IBP, defined as the temperature at which the first drop of distillation product is obtained, to a final boiling point, FBP, when the highest-boiling compounds evaporate.

According to an embodiment, a paraffinic hydrocarbon intermediate of biological origin having a cloud point (CP) according to ASTM D5773 for example −45° C., and having a freezing point (FP) according to IP529 of −41° C., and being of biological origin, such as vegetable origin and/or animal fat, is distilled into two cuts: IBP-68% and 68%-FBP. This enables obtaining just two products, one (IBP-68%) fulfilling the HEFA-SPK specification ASTM D7566-20 Annex A2 and one (68%-FBP) fulfilling preferably the API Group II or V specification, or at least a set of specifically desired properties, such as saturates (ASTM D2007) more than 90 wt-%, sulfur content (ASTM D1552/D2622/D3120/D4294/D4927) 0.03 wt-% or less, kinematic viscosity 100° C. (EN ISO 3104/ASTMD445) between 1.3-3.5 mm²/s, kinematic viscosity 40° C. (EN ISO 3104/ASTMD445) between 3.4-13 mm²/s, pour point (ASTM D97) less than −24° C., flash point (ENISO2719/ASTMD93) more than 120° C., without the need for any other processing steps. Yield of the lighter fraction or cut (IBP-68%) fulfilling the HEFA-SPK specification of 68 wt-% may be obtained, and yield of the heavier fraction (68%-FBP) fulfilling the base oil specification of 32 wt-% may be obtained.

According to another embodiment, a paraffinic hydrocarbon intermediate of biological origin having a cloud point (CP) of −49° C. or below, may be distilled into two cuts: IBP-80% and 80%-FBP, which thus enables obtaining two products only, one (IBP-80%) fulfilling the HEFA-SPK specification and the other (80%-FBP) fulfilling the requirements for base oil, without the need for other processing steps. Yield of the lighter cut fulfilling the HEFA-SPK specification of 80 wt-% may be obtained, and yield of the heavier fraction fulfilling the base oil specification of 20 wt-% may be obtained.

The present invention thus discloses a method for combined production of two paraffinic hydrocarbon products, an aviation fuel component and a base oil component, by hydrodeoxygenation and isomerization of feedstock of biological origin followed by fractionating. More specifically, the present invention discloses a method for combined production of paraffinic products of biological origin, comprising hydrodeoxygenation and isomerization of feedstock of biological origin, followed by fractionating thus obtained paraffinic hydrocarbon intermediate by e.g. distillation into at least two fractions, such as two fractions. Preferably, the two fractions are a lighter fraction fulfilling the specification for an aviation fuel component, and a heavier fraction fulfilling the specification for a base oil component.

The processing conditions may be selected suitably to obtain a desired yield ratio for the two fractions, and to adjust the technical performance characteristics thereof. Especially, a higher temperature and/or longer residence time in the isomerization stage may be applied to increase the downstream distillation yield of the HEFA-SPK component. Moreover, selecting feedstock of biological origin providing a high amount of hydrocarbons shorter than or equal to C17 hydrocarbons may further increase the yield of the HEFA-SPK component.

In one embodiment, the paraffinic hydrocarbon intermediate for the fractionation, preferably by distillation, is provided by catalytic hydrotreatment and catalytic isomerization of feedstock of biological origin.

In another embodiment, the hydrotreatment is catalytic hydrodeoxygenation.

In a yet further embodiment, the paraffinic hydrocarbon intermediate may be obtained by combined hydrotreatment and isomerization, preferably combined catalytic hydrotreatment, such as catalytic hydrodeoxygenation, and catalytic isomerization, such as catalytic hydroisomerization.

In some cases feedstock may contain recycled material in addition to e.g. waste and residues, such as recycled plastics material of biological origin.

One embodiment enables the use of the paraffinic hydrocarbon intermediate production process for combined production of two high value products. It is seen beneficial for the aviation fuel product to fractionate out the heaviest components from the paraffinic hydrocarbon intermediate as later explained, whereas it is at the same time needed to remove the lightest components from the base oil to ensure safety in terms of adequately high flash point.

In an embodiment, the production capacity of the base oil component and the aviation fuel component may be adjusted by the selection of the process conditions and feedstock composition in the paraffinic hydrocarbon intermediate production process. This makes it possible to find a cost-efficient and material-efficient way for production of these products without formation of any other by-products.

Figure 2:
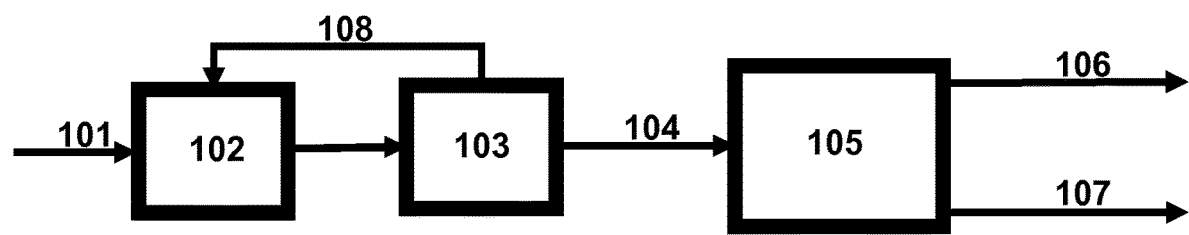
FIG. 2 illustrates another exemplary process.

The low temperature performance of the base oil component and/or the aviation fuel component may be improved by having a high isoparaffin content of the paraffinic hydrocarbon intermediate through adjusting the isomerization. The isomerization temperature may be selected from the higher end of the temperature range, such as from 330° C. to 340° C., whereby cracking tendency is enhanced. Moreover, the density and the flash point of the obtained components may be decreased by increasing the reflux rate of lighter components after isomerization. The liquid effluent from the isomerization may be directed to stabilization in a stabilization column at a lowered pressure compared to isomerization, wherein an overhead fraction is formed in addition to the liquid paraffinic hydrocarbon intermediate. This overhead fraction comprises hydrocarbons in the naphtha range (C4-C8). This overhead fraction from the stabilization may be recovered and used as a gasoline component, or preferably, it may be recycled back to the stabilization for refluxing, preferably into the stabilization column set up as depicted in FIG. 2. Thus, preferably according to the present invention the feedstock is subjected, after hydrotreatment and isomerization, to stabilization at a pressure lower than the isomerization pressure. The recycled amount of the hydrocarbons in the naphtha range used for refluxing may be from 80 wt-% or more, preferably 90 wt-% or more, such as from 90 to 95 weight-%, of the formed hydrocarbons in the naphtha range at the stabilization column overhead. A high recycle amount aids in the subsequent separation of the lighter and heavier fractions, and increases the yields of the obtained aviation fuel and base oil components. Naturally, a higher refluxing requires adjustment of the equipment for higher flow. Thus, preferably according to the present invention during stabilization an overhead fraction comprising hydrocarbons in the naphtha range (C4-C8) is formed, and an amount of 60 wt-% or more, such as 90 wt-% or more, such as from 90 to 95 wt-%, of the formed hydrocarbons in the naphtha range at the stabilization column overhead is recycled back to the stabilization.

For the base oil component it may technically be beneficial to further refine the base oil component containing fraction by a second fractionating step to eliminate some of the heavy components or other impurities.

FIG. 1 illustrates an exemplary process wherein feedstock of biological origin (101) is subjected to hydrotreatment and isomerization in two reaction steps, namely first subjecting the feedstock to hydrodeoxygenation in a hydrodeoxygenation zone (102) and subsequently subjecting the hydrodeoxygenated feedstock to isomerization in an isomerization zone (103). The paraffinic hydrocarbon intermediate (104) obtained after isomerization is further subjected to fractionation by distillation in a distillation column (105). As a result, two fractions 106, 107 are obtained from the distillation. In the two fractions, the lighter fraction 106 is a distillate fulfilling a specification for HEFA-SPK fuel component, and the heavier fraction 107, which may be the bottom fraction, is suitable for a base oil component. The HEFA-SPK fuel component (106) may be obtained from paraffinic hydrocarbon intermediate 104 during a distillation from an initial boiling point (IBP) to for example cut point of about 280-290° C., such as 282° C., to achieve a HEFA-SPK component (106) with a yield of 68 wt-% compared to distillation feed (104). Consequently, the distillation bottom component (107) is obtained from cut point of about 280-

290° C., such as 282° C., to final boiling point (FBP) with a 32 wt-% yield compared to distillation feed mass. The base oil component (107) may be the bottom fraction from the distillation column (105), or the heavier fraction from the distillation (105).

FIG. 2 illustrates another exemplary process, wherein feedstock of biological origin (101) is subjected to hydrotreatment and isomerization in two reaction steps, namely first subjecting the feedstock to hydrodeoxygenation in a hydrodeoxygenation zone (102) and subsequently subjecting the hydrodeoxygenated feedstock to isomerization in an isomerization zone (103). The hydrodeoxygenated and isomerized feedstock enters stabilization in a stabilization zone 108. During stabilization a gaseous overhead fraction is formed due to pressure decrease, and in addition the liquid paraffinic hydrocarbon intermediate 104 may be directed into fractionation 105. The gaseous overhead fraction comprises hydrocarbons in the naphtha range (C4-C8). Most of these naphtha range hydrocarbons of the overhead fraction from stabilization are recycled (109) back to stabilization. The liquid paraffinic hydrocarbon intermediate (104) obtained is further subjected to fractionation by distillation in a distillation column (105). As a result, two fractions 106, 107 are obtained from the distillation. In the two fractions, the lighter fraction 106 is a distillate fulfilling a specification for aviation fuel component, and the heavier fraction 107, which may be the bottom fraction, fulfils a specification for base oil component. As an example, HEFA-SPK fuel component (106) fulfilling the specification ASTM D7566-20 Annex A2 may be obtained from paraffinic hydrocarbon intermediate (104) during a distillation from an initial boiling point (IBP) to cut point of about 280-290° C., such as 282° C., to achieve a HEFA-SPK component (106) with a yield of 68 wt-% compared to distillation feed (104) mass. Consequently, the distillation bottom base oil component (107) is obtained from cut point of about 280-290° C., such as 282° C., to final boiling point (FBP) with a 32 wt-% yield compared to distillation feed mass. The base oil component 107 may be the bottom fraction from the distillation column 105, or the heavier fraction from the distillation 105.

The Aviation Fuel Component of Biological Origin

A specification for an aviation fuel component may refer to one or more or all specifications of ASTM D7566-20 Annex A2 for HEFA-SPK (synthesized paraffinic kerosene from hydroprocessed esters and fatty acids), such as density (at 15° C.), flash point, freezing point, thermal stability, distillation-10% recovery, distillation-50% recovery, distillation-FBP, distillation-residue, distillation-loss, and/or existent gum, especially at least density (at 15° C.), thermal stability and freezing point.

In an embodiment, a HEFA-SPK fuel component obtainable by said method is disclosed.

In an embodiment, the HEFA-SPK fuel component has a density of less than 772 kg/m$^3$ as measured at 15° C. according to ASTM D4052, preferably less than 770 kg/m$^3$, more preferably less than 769 kg/m$^3$.

In an embodiment the HEFA-SPK fuel component has a density of from 772 kg/m$^3$ to 750 kg/m$^3$, preferably 772 kg/m$^3$ to 760 kg/m$^3$, more preferably from 770 kg/m$^3$ to 765 kg/m$^3$ as measured at 15° C. according to ASTM D4052

In an embodiment the HEFA-SPK fuel component has a freezing point of less than −40° C. as measured according to IP529, preferably less than −45° C., more preferably less than less than −50° C., most preferably less than −53° C.

In an embodiment the HEFA-SPK fuel component has a freezing point from −40° C. to −65° C., preferably from −40° C. to −60° C., more preferably from −40° C. to −55° C. as measured according to IP529.

In an embodiment the HEFA-SPK fuel component has a flash point from 50° C. to 75° C., preferably from 60° C. to ° C. 70° C. as measured according to IP170.

In an embodiment, the HEFA-SPK fuel component is used as an aviation fuel component of biological origin.

The Base Oil Component of Biological Origin

In an embodiment the present invention provides a base oil component of biological origin, obtainable by the method of the present invention. The base oil component of the present invention fulfils at least a set of specifically desired properties, such as saturates (ASTM D2007) more than 90 wt-%, sulfur content (ASTM D 1552/D2622/D3120/D4294/D4927) 0.03 wt-% or less, kinematic viscosity 100° C. (EN ISO 3104/ASTMD445) between 1.3-3.5 mm$^2$/s, kinematic viscosity 40° C. (EN ISO 3104/ASTMD445) between 3.4-13 mm$^2$/s, pour point (ASTM D97) less than −24° C., flash point (ENISO2719/ASTMD93) more than 120° C. Preferably, the base oil component of the present invention fulfils the API Group II or III or V base oil specifications. For fulfilling the API Group II or III specification the KV100 needs to be above 2 i.e. within the range of 2-3.5 enabling the determination of the VI according to ASTM D2270.

In an embodiment the base oil component of the present invention comprises saturated hydrocarbons of at least 90 wt-% (ASTM D2007), 0.03 wt-% or less sulfur (ASTM D1552/D2622/D3120/D4294/D4927) and preferably it has a viscosity index within the range from 80 to 120 or higher than 120.

Besides the described requirements, the base oil may need to fulfil yet further requirements depending on the intended use thereof. Base oil stock needs to serve as such or as a component in selected formulations for high-performance engine oils, driveline fluids or industrial lubricants. Typically, the further requirements focus on properties or performance features of the base oil, such as high oxidation stability, low evaporation, excellent low temperature fluidity or extremely low sulphur content, meaning that the actual chemical compounds within the base oil composition may vary.

Structurally the base oil component of the present invention may be defined by the carbon chain length i.e. carbon number ranges and by the branching of the compounds. The base oil component of the present invention comprises 0-5 wt-% of n-paraffins in C16-C20 range and 90-97 wt-% isoparaffins in C16-C20 range, from 21 wt % to 45 wt % of C17 paraffins and from 50 wt % to 75 wt % of C18 paraffins.

In an embodiment the base oil component of the present invention comprises 0-8 wt-% of n-paraffins in C17-C19 range, preferably 0-5 wt-%, because with a reduced n-paraffin concentration the low temperature properties e.g. cloud point and/or freezing point are improved.

In an embodiment the base oil component of the present invention comprises 85-95 wt-% isoparaffins in C17-C20 range, preferably 88-95 wt-%.

In an embodiment base oil component of the present invention comprises from 21 wt % to 43 wt % of C17 paraffins.

In an embodiment base oil component of the present invention comprises from 45 wt % to 75 wt % of C18 paraffins, preferably 53-75 wt-%, to increase the base oil density and enable better blending with further components.

In an embodiment base oil component of the present invention comprises 0-4 wt-% of n-paraffins in C17-C18 range and 85-90 wt-% isoparaffins in C17-C18 range.

Characterisation of the hydrocarbons, such as analysis of n-paraffins, isoparaffins and defining the carbon numbers) may be conducted using Gas Chromatography/Flame Ionization method comparable to UOP990. The above wt-% refer to weight percentages as calculated from the total weight of the base oil component of biological origin.

In an embodiment isomerization degree is 90-99.9%, such as 95-99%. The isomerization degree is defined as the ratio of the amount of i-paraffins to the total amount of paraffins by weight. The ratio of i-paraffins to n-paraffins in the C14-C20 range is from 18 to 32.

Moreover, the new emission legislation is one driver for using more advanced base oils. For example, the latest catalytic converter technologies require very low impurity levels, and therefore, better engine lubricants are needed. Conventional mineral oil based lubricants may not fulfil the latest specifications and better base oils are needed to replace those in high-performance lubricants. And yet, a further aspect is the GHG emission reduction and the tendency to decrease the use of fossil based feedstock. Increasing the bio content of the base oil will reduce the greenhouse gas emissions (GHG). Replacing a base oil totally with the base oil component of the present invention results in at least 50% reduction, such as at least 70% reduction, or even such as 90% reduction, in GHG emissions (gCO2 eq/MJ). The present invention offers a base oil component which is renewable i.e. of biological origin, and which in addition has attractive properties.

In an embodiment the base oil component of biological origin has modern carbon content (pMC; ASTM D6866) of more than 95%, such as about 100%.

In an embodiment the base oil component of the present invention is mainly paraffinic with only few or low amounts of impurities. Accordingly, the base oil component of biological origin may be characterised in that at least one or more, but possibly even all, of the impurities, if present, comprise:

less than 1.5 wt-% aromatic hydrocarbons, such as less than 0.5 wt-% determined by Infrared Red spectroscopy (IR);
sulphur content (ASTM D3120) less than 100 ppm, such as less than 50 ppm, or even less than 5 ppm;
saturates (ASTM D2007) more than 99.5 wt-%, or even more than 99.6 wt-less than 0.5 wt-% polycyclic aromatics (PCA) (IP346), such as less than 0.3 wt-%.
less than 1.0 wt % di-, tri-, tetra-naphthenes, or higher naphthenes, preferably less than 0.5 wt %;
less than 1 wt-% of oxygen-containing compounds, preferably less than 0.5 wt %, such as less than 0.3 wt %, for example 0.1 wt % or less;
less than 100 ppm nitrogen or less than 10 ppm nitrogen, such as less than 1 ppm nitrogen content as measured using ASTM D4629.

The base oil may further be functionally characterised by having one or more of the following properties:

Kinematic viscosity at 100° C. (KV100, ASTM D445) is between 1.35-3.5 mm$^2$/s, such as between 1.35-3.0 smm$^2$/s;
Kinematic viscosity at 40° C. (KV40, ASTM D445) is between 3.5-4.2 mm$^2$/s, such as between 3.5-4.0 mm$^2$/s
Kinematic viscosity at −20° C. (KV-20)(ASTM D445) is less than 135 mm$^2$/s, such as less than 35 mm$^2$/s;
Pour point (ASTM D97) is less than −35° C., less than −42° C.; less than −48° C., or even less than 50° C.;
Flash point (ASTM D is more than 130° C., such as more than 135° C.;
Viscosity index (VI) is more than 80, such as more than 90, such as more than 100 as calculated based on KV100 and KV40;
Noack volatility at 25° C. (ASTM D5800 or CECL-40-93-B) is less than 50;
Cold-Cranking Simulator viscosity (CCS-30° C.) (ASTM D5293) is less than 1800 mPas;
Density (EN ISO 12185/AST M D4052) is 830 kg/m$^3$ or less, such as less than 810 kg/m$^3$, such as from 800 to 750 kg/m$^3$, even such as from 800 to 780 kg/m$^3$;
Oxidation stability (ASTM D2272) is at least 200 min, such as at least 400 min, such as at least 600 min, or even at least 650 min.

In an embodiment the base oil component has a cloud point (ASTM D7689) of lower than −20° C., such as lower than −25° C., such as lower than −30° C., or even −32° C. or lower.

In an embodiment the appearance of the base oil component of the present invention is clear and bright liquid based on visual observance. In addition, no water or particulates are observed.

The properties of the base oil component of the present invention as described in the foregoing embodiments can be combined in any possible way.

In an embodiment the base oil component of the present invention is manufactured using the above described method.

Base Oil Blends

The base oil component of the present invention may further be used for a blending component for base oil stocks, especially for increasing the biological content thereof and thus mitigating the emission properties, and further enhancing the selected properties for desired applications.

The present invention further provides base oil blends comprising the base oil component of the present invention and at least one additional base oil component, selected from fossil base oil and synthetic base oil and combinations thereof.

The base oil component of the present invention and the base oil blends of the present invention may be used as base oil stock, especially base oil stock suitable for use as a lubricant or in lubricant formulations.

The base oil blends of the present invention preferably comply with the API Group II or III or V specifications for base oils, or at least they fulfill the same requirements as the additional blending components that were used. They may be prepared by mixing the desired components in any order with the base oil component of the present invention. The renewable base oil component of the present invention may be used to increase the bio-content of the base oils currently commercially available. In addition the renewable base oil component may be used to provide novel blends which fulfil the set specifications or which have at least as good properties as the currently used fossil-based base oils. They may further provide a set of properties that is not obtainable by combining the fossil base oil stocks available.

By "fossil base oil" is meant herein any crude oil based base oil preferably fulfilling the API Group II or III or V specifications or specific requirements set by the application. Group II base oil can be employed in a multitude of applications such as marine and gas engine applications, in trunk piston engine oils, and other applications in the base oil industry. There are several commercial producers for these products, such as e.g. Neste OY providing the NEXBASE™ 3000 series base oils. As an example, the particular products offered under API Group II or III, have further specifications rendering the base oil suitable for specific applications. Examples of the technical data of these products and their particular specifications are available at the internet (e.g. NEXBASE 3020™; https://www.neste.com/products/all-products/base-oils/products/nexbase-3020 and NEXBASE 3030™: https://www.neste.com/products/all-products/base-oils/products/nexbase-3030 accessed on Nov. 11, 2020).

By "synthetic base oil" is meant herein any base oils fulfilling the API Group II or III or IV criteria but originating from biological feedstock, such as fatty acids or esters thereof or any other biological raw material, using a different manufacturing route compared to the one described in this disclosure, such as e.g. through the ketonisation route as described e.g. in EP1963461, through oligomerisation or farnesene route.

Exemplary Base Oil Blends According to the Present Invention

Base Oil Blend I: Base Oil Component of the Present Invention and at Least One Fossil Base Oil In an embodiment the base oil blend comprises the base oil component of the present invention and at least one fossil base oil, wherein the blend comprises from 1 wt-% to 99 wt-% of the base oil component of the present invention and the remainder comprising at least one fossil base oil, such as a fossil base oil mixture selected from NEXBASE 3020™ and NEXBASE 3030™ base oils, or the like.

Suitable base oils may be blended in various ratios to enable to obtain the desired properties for the final blend based on the demands of the application. However, the properties of the blends may not be directly additive i.e. derivable from those of the components of the blends. Occasionally, there seems to be some surprising interaction depending on the blend components.

In an embodiment the base oil blend comprises from 5 wt-% to 20 wt-% of the base oil component of the present invention, the remainder comprising at least one fossil base oil. Whilst increasing the bio-content of the blend also the base oil properties may be enhanced, such as increase in flash point and decrease in pour point, due to the excellent properties of the base oil component of the present invention.

Base Oil Blend II: Base Oil Component of the Present Invention and Synthetic Base Oil In an embodiment the base oil blend comprises the base oil of biological origin of the present invention and synthetic base oil, wherein the blend comprises from 1 wt-% to 99 wt-% of the base oil of biological origin of the present invention, the remainder comprising the synthetic base oil.

Base Oil Blend III: Base Oil Component of the Present Invention and at Least One Fossil Base Oil and Synthetic Base Oil In an embodiment the base oil blend comprises the base oil of the present invention and at least one fossil base oil and synthetic base oil, wherein the blend comprises from 1 wt-% to 98 wt-% of the base oil of biological origin of the present invention and from 1 wt-% to 98 wt-% of at least one fossil base oil and from 1 wt-% to 98 wt-% of the synthetic base oil.

Lubricating Oil

The most important component of a lubricating oil, also known as a lubricant formulation is its base oil component. The properties of the base oil may be supplemented by different types of performance additives i.e. auxiliary agents. However, the base oil stock used determines the basic characteristics of the lubricant, which may be modified to a limited extent by addition of the auxiliary agents.

These auxiliary agents are typically sold as packages. The chemicals contained in these packages may be plenty, such as tens of different chemicals, and they aid in improving or imparting certain properties, depending on the desired product or application thereof. They may include antioxidants, metal deactivators, corrosion inhibitors, detergents, dispersants, antiwear additives, friction modifiers, pour point depressants, viscosity improvers, foam inhibitors, thickeners, demulsifiers, emulsifiers, bactericides, fungicides and tackiness additives. They may be single purpose, or more likely multipurpose additives. Specific examples of auxiliary agents are described in e.g. Gresham et al, Lubrication and Lubricants, 2015, Kirk-Othmer Encyclopedia of Chemical technology, 1-77.

The base oil component of the present invention and the base oil blends of the present invention may be used as lubricants as such or additionally comprising at least one auxiliary agent.

In an embodiment the lubricant composition of the present invention comprises a base oil component of the present invention or a base oil blend of the present invention and at least one auxiliary agent.

In an embodiment the lubricating oil comprises 80-99.8 wt-% of the base oil component of the present invention or the base oil blend of the present invention.

According to another embodiment the lubricating oil comprises 80-99.8 wt-% of the base oil blend of the present invention.

In an embodiment the lubricating oil comprises 0.2-20 wt-%, such as from 5 to 20 wt-%, of at least one set of auxiliary agents wherein said wt-% are calculated from the total lubricating oil weight.

In an embodiment the auxiliary agent is selected from a group consisting of antioxidants, metal deactivators, corrosion inhibitors, detergents, dispersants, antiwear additives, friction modifiers, pour point depressants, viscosity improvers, foam inhibitors, thickeners, demulsifiers, emulsifiers, bactericides, fungicides and tackiness additives, or a mixture thereof.

EXAMPLES

Example 1

Feedstock of biological origin provided for the experiments contained 73% AF (animal fat) and 27% PFAD (palm oil fatty acid distillate). After pretreatment by bleaching, the feedstock was subjected first to hydrodeoxygenation at about 300-340° C., about 50 bar, using sulphided NiMo on alumina catalyst with WHSV of about 2.7 h-1 and hydrogen flow about 590 Nl/l feed. Subsequently, the hydrodeoxygenated paraffinic hydrocarbon feedstock was directed to isomerization at 330-340° C., about 40 bar, in the presence of Pt-SAPO catalyst with WHSV of about 1.5 h-1 and a hydrogen to feed ratio of about 300 Nl/l feed. The effluent from the hydroisomerization was stabilized by refluxing the overhead naphtha about 92 wt-%.

The obtained paraffinic hydrocarbon intermediate was fractionated by distillation into two cuts of biological origin; one fulfilling the specification ASTM D7566-20 Annex A2 for HEFA-SPK and one essentially fulfilling the API Group II or III specifications for base oil or the specification for selected applications within the API Group V.

The distillation was performed using plant scale batch distilling apparatus. Yields from the plant scale distillation were:

initial boiling point (IBP) to 68% distillation point: 68 wt-% (i.e. the HEFA-SPK cut),
68% distillation point to final boiling point (FBP): 32 wt-% (i.e. the base oil component 1).

Example 2

Table 1 shows the key properties for component 1 obtained in Example 1, defining the usability of the component as base oil, essentially meeting the requirements of API Group II specifications. Table 1 further shows properties which are advantageous for the use of the component for different base oil blends and properties required for selected applications within the API Group V.

TABLE 1

| Standard | Method | Unit | component 1 Result | API Group II base oil Limits | API Group V and selected applications Limits |
| --- | --- | --- | --- | --- | --- |
| ASTM D2007 | Saturates | wt-% | 99.7 | Min 90 | Min 90 |
| ENISO20846 | Sulfur | wt-% | <0.0001 | Max 0.03 | Max 0.03 |
| ASTM D2270 | Viscosity Index | | N/A* | 80-120 | — |
| ENISO 3104/ ASTM D445 | Kinematic viscosity 40° C. | mm$^2$/s | 3.76 | — | 3.4-4.5 |
| ENISO 3104/ ASTMD445 | Kinematic viscosity 100° C. | mm$^2$/s | 1.48 | — | 1.3-4.0 |
| ENISO 3104 | Kinematic viscosity- 20° C. | mm$^2$/s | 31.08 | — | — |
| ENISO 2719/ ASTM D93 | Flash point | ° C. | 136 | — | >120 |
| ASTMD5950/ ASTM D 97 | Pour point | ° C. | −51 | — | <-24 |
| ENISO 12185/ ASTM D4052 | Density at 15° C. | kg/m$^3$ | 787.1 | — | — |
| ASTM D7689 | Cloud point | ° C. | −33 | — | — |
| EN 116 | CFPP | ° C. | −31 | — | — |
| CECL-40-93-B | NOACK 150 | wt-% | 7.1 | — | — |
| CECL-40-93-B | NOACK 100 | wt-% | 8.6 | — | — |
| ASTM D2272 | Oxidation stability | min | 664 | — | — |

* The standard is not applicable to KV100 < 2 mm$^2$/s values.

The base oil component 1 exhibits a high flash point which ensures safe product handling. Furthermore, the good cold properties provide excellent operability at low winter temperatures.

Table 2 shows the chemical composition in terms of carbon chain length distribution obtained for the base oil component 1 of example 1. The total amount of i-paraffins were 95.20 m-% and n-paraffins 4.80 m-%.

TABLE 2

| Carbon chain length | Total amount of paraffins wt-% | i-paraffin amount (wt-%) |
| --- | --- | --- |
| C14 and below | 0.79 | 0.74 |
| C15 | 0.86 | 0.78 |
| C16 | 5.80 | 5.02 |
| C17 | 35.86 | 33.36 |
| C18 | 53.7 | 52.45 |
| C19 | 1.73 | 1.65 |
| C20 and above | 1.25 | 1.21 |

The base oil component's carbon number distribution is concentrated on the C16-C18 range. The amount of longer carbon chains C19 and above and heavier traces is limited to less than 3 mass-% which explains good cold properties. Furthermore, the low amount of shorter carbon chains, C15 and below, explain the high product flash point.

Table 3 depicts the distillation properties of component 1 of example 1.

TABLE 3

| ASTM D86 (EN ISO 3405) | Component 1 |
| --- | --- |
| IBP (° C.) | 278.7 |
| T10 (° C.) | 290.3 |
| T50 (° C.) | 292.8 |
| T90 (° C.) | 297.9 |
| T95 (° C.) | 303.8 |
| FBP (° C.) | 316.6 |

TABLE 3-continued

| ASTM D86 (EN ISO 3405) | Component 1 |
| --- | --- |
| Distillation residue (wt-%) | 2 |
| Distillation loss (wt-%) | 0.6 |

The results shown in Table 4 demonstrate that the IBP-68% distilled product of example 1 meets the renewable aviation fuel specification (ASTM D7566-20, Annex A2) for HEFA-SPK. Density requirement of below 772 kg/m3 (measured at 15° C. according to ASTM D4052) was achieved with the performed distillation wherein density of the feed was 779 kg/m3 (measured at 15° C. according to ASTM D4052). Freezing point of below −49° C. was achieved. In Table 4, the distillation results for IBP-68% of example 1 refer to key parameters defining the usability of the distilled product as aviation fuel component as defined in ASTM D7566-20. The distilled product IBP-68% of example 1 further fulfills the other applicable requirements set in ASTM D7566-20 Annex A2.

TABLE 4

| Standard | Method | Unit | IBP-68% | ASTM D7566-20 Annex A2 |
|---|---|---|---|---|
| ASTM D4052 | Density (at 15° C.) | kg/m³ | 771.8 | 730-772 |
| IP170 | Flash point | ° C. | 47.0 | Min. 38 |
| IP529 | Freezing point | ° C. | −49.5 | Max. −40 |
| ASTM D86 | Distillation-10% recovery | ° C. | 200.6 | Max. 205 |
| ASTM D86 | Distillation-50% recovery | ° C. | 266.0 | — |
| ASTM D86 | Distillation-FBP | ° C. | 285.3 | Max. 300 |
| IP540 | Existent gum | mg/100 ml | <1 | Max. 7 |
| ASTM D3242 | Total acidity | mg KOH/g | 0.002 | Max. 0.015 |

Example 3

The base oil component 1 obtained in example 1 was used in blends containing fossil base oils A, B, C and D of varying properties. The aim was to obtain desired properties for selected applications by a suitable blending.

Table 5 depicts typical properties of selected currently commercially available fossil base oils A, B, C and D for comparison with properties of the base oil component 1 obtained in example 1. The values in brackets are the set limits for the values and the values not in brackets are the actual values for the samples.

TABLE 5

| method | standard | unit | A | B | C | D |
|---|---|---|---|---|---|---|
| Cloud point | ASTM D7689 | ° C. | −32.0 | −33.0 | — | −26.0 |
| Pour Point | ASTM D5950/ ASTM D97 | ° C. | −57 (<−40) | −45 (<−42) | −30 (≤−24) | −36.0 |
| KV100 | EN ISO 3104/ ASTM D445 | mm²/s | 1.444 (1.3-2.0) | 2.2 (2.1-2.3) | 3 (2.7-3.1) | 3.45 |
| Viscosity Index | ASTM D2270 | | — | — | 111 (≥100) | 113 |
| KV-20 | ASTM D445 | mm²/s | — | 125 (<135) | — | — |
| KV40 | EN ISO 3104/ ASTM D445 | mm²/s | 3.936 (3.4-4.5) | 7.5 (>7.1) | 12 | 14.6 |
| Flash Point | EN ISO 2592 ASTM D93/ ASTM D92 | ° C. | 126 (>120) | 165 (>155) | 190 (≥170) | 210 |
| Density 15° C. | ASTM D4052 | kg/m³ | 827 (780-840) | 827 | 828.2 | 832 |
| Noack 250 | CECL-40-93-B | wt-% | — | — | — | 23.0 |
| Saturated paraffins | ASTM D7419/ ASTM D2007 | wt-% | 99.8 (>90.0) | — | — | — |
| Sulphur | EN ISO 20846 | mg/kg | <1 (<10) | — | — | — |

Example 4

The base oil component 1 of example 1 was blended with commercial fossil base oils B and C of table 6. The blend comprised 10 vol-% of the base oil component 1 of example 1, 60 vol-% of B and 30 vol-% of C.

The blend showed the following characteristics:
Cloud Point (ASTMD5771) −30.7° C.
Pour point (ASTM 5950) −45° C.
Kinematic Viscosity at 40° C. (ENISO3104) 7.928 mm2/s
Kinematic Viscosity at 100° C. (ENISO3104) 2.313 mm2/s
Viscosity index (ASTMD2270) 104.3
Flash Point (ENISO2719) 157.5° C.

The base oil blend complies with API Group II specification as shown in table 1 for base oil in terms of having saturated hydrocarbons more than 90 wt-%, sulfur content less than 0.03 wt-% and viscosity index within the range from 80 to 120. As further seen from the obtained results, the blend fulfills almost all main specification parameters and shows that there is flexibility when blending a base oil component of biological origin to a fossil base oil. The pour point and flash point are at a good level in this blend. The base oil component of biological origin suits well for a base oil blend.

Example 5

The base oil component 1 of example 1 was blended with commercial fossil base oils B and D. The blend comprised 10 vol-% of base oil component 1 of example 1, 10 vol-% of B and 80 vol-% of D.

The blend showed the following characteristics:
Cloud Point (ASTMD5771) −28.5° C.
Pour point (ASTM 5950) −45° C.
Kinematic Viscosity at 40° C. (ENISO3104) 11.77 mm2/s
Kinematic Viscosity at 100° C. (ENISO3104) 3.017 mm2/s
Viscosity index (ASTMD2270) 112.4
Flash Point (ENISO2719) 177° C.

The base oil blend complied with API Group II specification for base oil in terms of having saturated hydrocarbons more than 90 wt-%, sulfur content less than 0.03 wt-% and viscosity index within the range from 80 to 120. As further seen from the obtained results, the blend fulfills almost all main specification parameters and shows that there is flexibility in blending a base oil component of biological origin to a fossil base oil. The pour point is excellent and the flash point is at a good level in this blend. The base oil component of biological origin was found to suit well for this kind of base oil blend.

Example 6

The base oil component 1 of example 1 was blended with commercial fossil base oil A using several different ratios of the components. It was observed that the renewable base oil component 1 of example 1 could be blended in any ratio, or used even as such, to comply with the requirements of the fossil base oil A, meaning that the fossil base oil can be replaced by a totally renewable base oil component without any drawbacks for the desired properties.

The invention claimed is:

1. A method for combined production of aviation fuel and base oil both of biological origin, the method comprising:
    providing feedstock of biological origin containing fatty acids and/or esters of fatty acids;
    subjecting the feedstock to hydrotreatment and isomerization to obtain a paraffinic hydrocarbon intermediate;
    fractionating said paraffinic hydrocarbon intermediate into at least two fractions,
    a lighter fraction fulfilling a specification ASTM D7566-20 Annex A2 for aviation fuel, and
    a heavier fraction fulfilling the following specifications for a base oil component, containing:
        saturates (ASTM D2007) more than 90 wt-%;
        sulfur content (ASTM D 1552/D2622/D3120/D4294/D4927) 0.03 wt-% or less;
        kinematic viscosity 100° C. (EN ISO 3104/ASTMD445) between 1.3-3.5 mm$^2$/s;
        kinematic viscosity 40° C. (EN ISO 3104/ASTMD445) between 3.4-13 mm2/s;
        pour point (ASTM D 97) less than −24° C.;
        flash point (ENISO2719/ASTMD93) more than 120° C.; and
    adjusting a production capacity of the lighter fraction and a production capacity of the heavier fraction by selection of process conditions, and/or isomerization process conditions, to produce a yield of the lighter fraction of 60-90 wt-% of a total weight of the formed fractions, and to produce yield of the heavier fraction of 10-40 wt-% of the total weight of the formed fractions;
    wherein a combined yield of the two fractions is at least 98 wt-% of the paraffinic hydrocarbon intermediate of biological origin.

2. The method according to claim 1, comprising:
    performing the hydrotreatment, and/or a hydrodeoxygenation, under a hydrogen pressure from 10 to 150 bar, and/or 20-120 bar, and/or 30-100 bar, and at a temperature from 200 to 400° C., and/or 250-380° C., and/or 280-360° C.

3. The method according to claim 1, comprising:
    performing the hydrotreatment in a presence of one or more catalyst(s) selected from hydrogenation metal on a support, and/or a catalyst selected from a group containing of Pd, Pt, Ni, Co, Mo, Ru, Rh, W and/or any combination thereof, and/or a catalyst containing one or more catalyst(s) selected from CoMo, NiMo, NiW, CoNiMo on a support, and/or an alumina support.

4. The method according to claim 1, comprising:
    performing the isomerization at a temperature of 200-500° C., and/or 280-370° C., and at a pressure of 10-150 bar, and/or 20-50 bar.

5. The method according to claim 1, comprising:
    performing the isomerization in a presence of one or more catalyst(s) containing a Group VIII metal on a support, where the support is selected from silica, alumina, clays, titanium oxide, boron oxide, zirconia, used alone or as a mixture, and/or as silica and/or alumina.

6. The method according to claim 1, comprising:
    subjecting the feedstock, after hydrotreatment and isomerization, to stabilization at a pressure lower than the isomerization pressure.

7. The method according to claim 6, comprising:
    forming during stabilization, an overhead fraction containing hydrocarbons in a naphtha range (C4-C8); and
    recycling an amount of 60 wt-% or more, and/or 90 wt-% or more, and/or from 90 to 95 wt-%, of the formed hydrocarbons in the naphtha range at the stabilization column overhead, back to the stabilization.

8. The base oil component of biological origin produced by the method according to claim 1.

* * * * *